US009826684B2

(12) United States Patent
Ouchida et al.

(10) Patent No.: US 9,826,684 B2
(45) Date of Patent: Nov. 28, 2017

(54) REMOTE SERVER (71) Applicant: YANMAR CO., LTD., Osaka-shi, Osaka (JP)

(72) Inventors: Takeshi Ouchida, Osaka (JP); Shingo Eguchi, Osaka (JP); Naoki Kawakami, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 14/914,423

(22) PCT Filed: Aug. 12, 2014

(86) PCT No.: PCT/JP2014/071317
§ 371 (c)(1),
(2) Date: Feb. 25, 2016

(87) PCT Pub. No.: WO2015/029775
PCT Pub. Date: Mar. 5, 2015

(65) Prior Publication Data
US 2016/0212939 A1    Jul. 28, 2016

(30) Foreign Application Priority Data

Aug. 28, 2013  (JP) ................................. 2013-176844

(51) Int. Cl.
*F02D 29/02*    (2006.01)
*A01D 41/127*    (2006.01)
(Continued)

(52) U.S. Cl.
CPC ....... *A01D 41/1274* (2013.01); *A01D 41/127* (2013.01); *F02D 29/02* (2013.01);
(Continued)

(58) Field of Classification Search
CPC combination set(s) only.
See application file for complete search history.

(56) References Cited

U.S. PATENT DOCUMENTS

2010/0007290 A1* 1/2010 Urakabe ............ H05B 33/0827
315/295
2010/0036696 A1    2/2010 Lang
(Continued)

FOREIGN PATENT DOCUMENTS

EP      1507245 A1    2/2005
JP    2004234260 A    8/2004
(Continued)

OTHER PUBLICATIONS

International Search Report corresponding to Application No. PCT/JP2014/071317; Date of Mailing: Sep. 16, 2014, with English translation.
(Continued)

*Primary Examiner* — Edward J Pipala
(74) *Attorney, Agent, or Firm* — Cantor Colburn LLP (57) ABSTRACT

There is provided a remote server that receives a machine type, an operating day, a position, a load factor, an engine rotational speed, a traveling speed, and a fuel consumption amount. The remote server identifies a working position based on the position, selects past operating days of an operation status corresponding to a current load factor of the same machine at the same working position, identifies a minimum fuel consumption amount out of fuel consumption amounts corresponding to the selected past operating days, and compares a current fuel consumption amount with the past minimum fuel consumption amount. If the current fuel consumption amount is larger than the past minimum fuel consumption amount, the remote server transmits an engine rotational speed and a traveling speed during a working period of the minimum fuel consumption amount, to a predetermined communication terminal corresponding to information for machine identification.

3 Claims, 6 Drawing Sheets (51) Int. Cl.
*G01F 9/00* (2006.01)
*G07C 5/00* (2006.01)
*G01S 19/13* (2010.01)
*G05D 1/00* (2006.01)
*H04L 29/08* (2006.01)
*G06Q 10/06* (2012.01)
*G07C 5/08* (2006.01)

(52) U.S. Cl.
CPC ............ *G01F 9/001* (2013.01); *G01S 19/13* (2013.01); *G05D 1/0011* (2013.01); *G06Q 10/06* (2013.01); *G07C 5/00* (2013.01); *G07C 5/008* (2013.01); *H04L 67/12* (2013.01); *F02D 2200/0625* (2013.01); *G07C 5/0816* (2013.01)

(56) References Cited

U.S. PATENT DOCUMENTS

2011/0257832 A1   10/2011   Ishida et al.

2013/0066583 A1*   3/2013   Foussard .............. B60W 40/02
                                                      702/130

FOREIGN PATENT DOCUMENTS

| | | |
|---|---|---|
| JP | 2006090177 A | 4/2006 |
| JP | 2008279836 A | 11/2008 |
| JP | 2010038959 A | 2/2010 |
| JP | 2010144684 A | 7/2010 |
| JP | 2011253239 A | 12/2011 |
| WO | 2005109273 A1 | 11/2005 |
| WO | 2008097283 A1 | 8/2008 |

OTHER PUBLICATIONS

Extended European Search Report corresponding to Application No. 14841140.8-1871/3040539 PCT/JP2014/071317; dated Apr. 6, 2017.

* cited by examiner

REMOTE SERVER

CROSS REFERENCE TO RELATED APPLICATIONS

This is the U.S. national stage of application No. PCT/JP2014/071317, filed on Aug. 12, 2014. Priority under 35 U.S.C. §119(a) and 35 U.S.C. §365(b) is claimed from Japanese Application No. 2013-176844, filed Aug. 28, 2013, the disclosure of which is also incorporated herein by reference.

TECHNICAL FIELD

The present invention relates to a technique of a remote server that advises an operation with low fuel consumption.

BACKGROUND ART

Conventionally, a technique of evaluating an operation status from the viewpoint of reducing a fuel consumption amount (energy saving) is known. For example, Patent Literature 1 discloses a configuration that teaches an operator improvement of a fuel consumption amount. According to the fuel-saving operation evaluation system disclosed in Patent Literature 1, how much the fuel can be saved can be quantitatively obtained.

However, according to the fuel-saving operation evaluation system disclosed in Patent Literature 1, the fuel consumption amount in the average operation time needs to be set in advance. Also, the above fuel-saving operation evaluation system has a configuration in which an on-vehicle controller performs calculation, and thus, it is difficult to compare an operator with other operators in real time. Further, according to the above fuel-saving operation evaluation system, it is also difficult to compare an operation with a past operation history due to a limit in storage capacity.

CITATION LIST

Patent Literature

PTL1: JP 2006-090177 A

SUMMARY OF INVENTION

Technical Problem

An object of the present invention is to provide a configuration that can teach an operator improvement of a fuel consumption amount and that facilitates a comparison with other operator in real time and a comparison with a past operation history, without requiring presetting of a fuel consumption amount during an average operation time.

Solutions to Problem

The remote server of the present invention receives information for machine identification, information on an operating day, position information, information on a load factor, information on a rotational speed of an engine, information on a moving speed, and information on a fuel consumption amount, from a terminal server provided in a machine. The remote server identifies a working position by a GPS, identifies from the working position a farm field in which work is currently performed, selects, based on the information for machine identification, past working periods during which a same machine in a same farm field is in an operation status corresponding to a current load factor, selects a period during which the fuel consumption amount is minimum in the selected past working periods, and compares a current fuel consumption amount with the past minimum fuel consumption amount. If the current fuel consumption amount is larger than the past minimum fuel consumption amount, the remote server transmits the information on the rotational speed of the engine and a speed change pattern of each working unit during a working period of the minimum fuel consumption amount to a predetermined communication terminal corresponding to the information for machine identification.

The remote server of the present invention receives information for machine identification, information on an operating day, position information, information on a load factor, information on a rotational speed of an engine, information on a moving speed, and information on a fuel consumption amount, from a terminal server provided in a machine. The remote server identifies a working position by a GPS, identifies from the working position a farm field in which work is currently performed, identifies a working season from the operating day, identifies past working periods during which a machine type same as a machine type identified based on the information for machine identification has a same load factor in a same working season in a same farm field, identifies a period during which a fuel consumption amount is minimum in the identified past working periods, and compares a fuel consumption amount of a working machine being currently working with the minimum fuel consumption amount. If the fuel consumption amount of the working machine of being currently working is larger than the minimum fuel consumption amount, the remote server transmits the information on the rotational speed of the engine and a speed change pattern of each working unit of the working machine whose fuel consumption amount is minimum during the period of the minimum fuel consumption amount to a predetermined communication terminal corresponding to the information for machine identification.

The remote server of the present invention receives information for machine identification, information on a load factor, information on a rotational speed of an engine, information on a moving speed, and information on a fuel consumption amount, from a terminal server provided in a machine. The remote server identifies a type of the engine based on the information for machine identification, identifies the rotational speed of the engine, torque, output, and a characteristic map of the fuel consumption amount which correspond to the type of the engine, identifies corresponding output in the characteristic map from the rotational speed of the engine and the load factor, and transmits, based on the characteristic map, the rotational speed of the engine and a speed change pattern of each working unit at an operating point of a minimum fuel consumption amount in the specified output, to a predetermined communication terminal corresponding to the information for machine identification.

Advantageous Effects of Invention

According to the remote server of the present invention, if a current fuel consumption amount is larger than a minimum fuel consumption amount within a past operation history of the same working machine in a similar operating condition, an operation status during a working period of the minimum fuel consumption amount can be recognized.

Further, if a current fuel consumption amount is larger than a minimum fuel consumption amount within a past operation history of a working machine of the same type in a similar operating condition, an operation status during a working period of the minimum fuel consumption amount can be recognized.

Further, an operation status of the engine using the minimum fuel consumption amount can be recognized in real time.

DESCRIPTION OF EMBODIMENTS

A remote server system 100 will be described with reference to FIG. 1.

Figure 1:
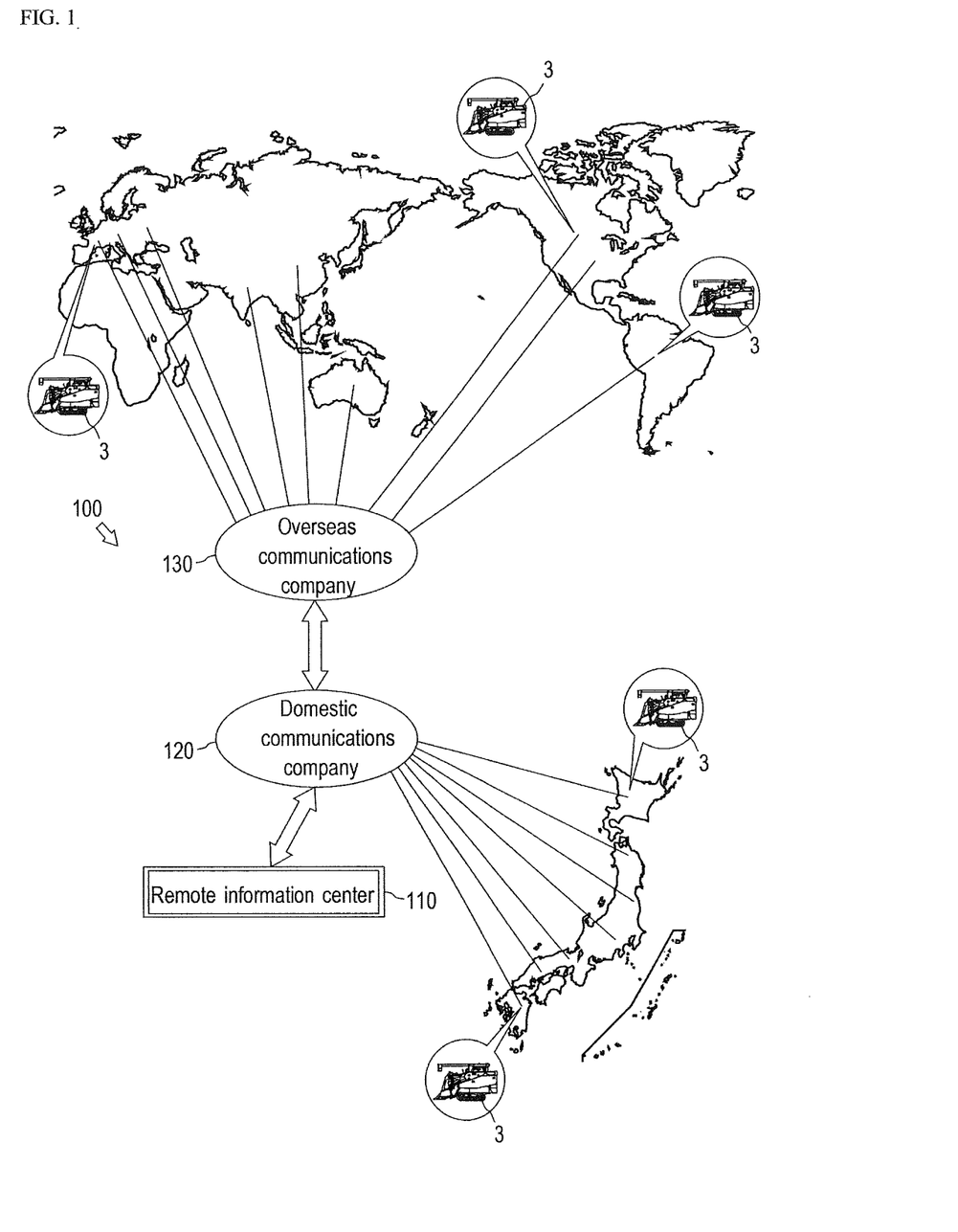
FIG. 1 is a schematic diagram showing a configuration of a remote server.

FIG. 1 schematically shows the remote server system 100.

The remote server system 100 is a system relating to a remote server according to an embodiment of the present invention. The remote server system 100 is a system that provides service to remote users. The remote server system 100 of the present embodiment is a system that provides service from a remote information center 110 to users who use combine harvesters 3 as agricultural machines, via an overseas communications company 130 in each country of the world and a domestic communications company 120.

The remote server system 100 will be further described with reference to FIG. 2.

Figure 2:
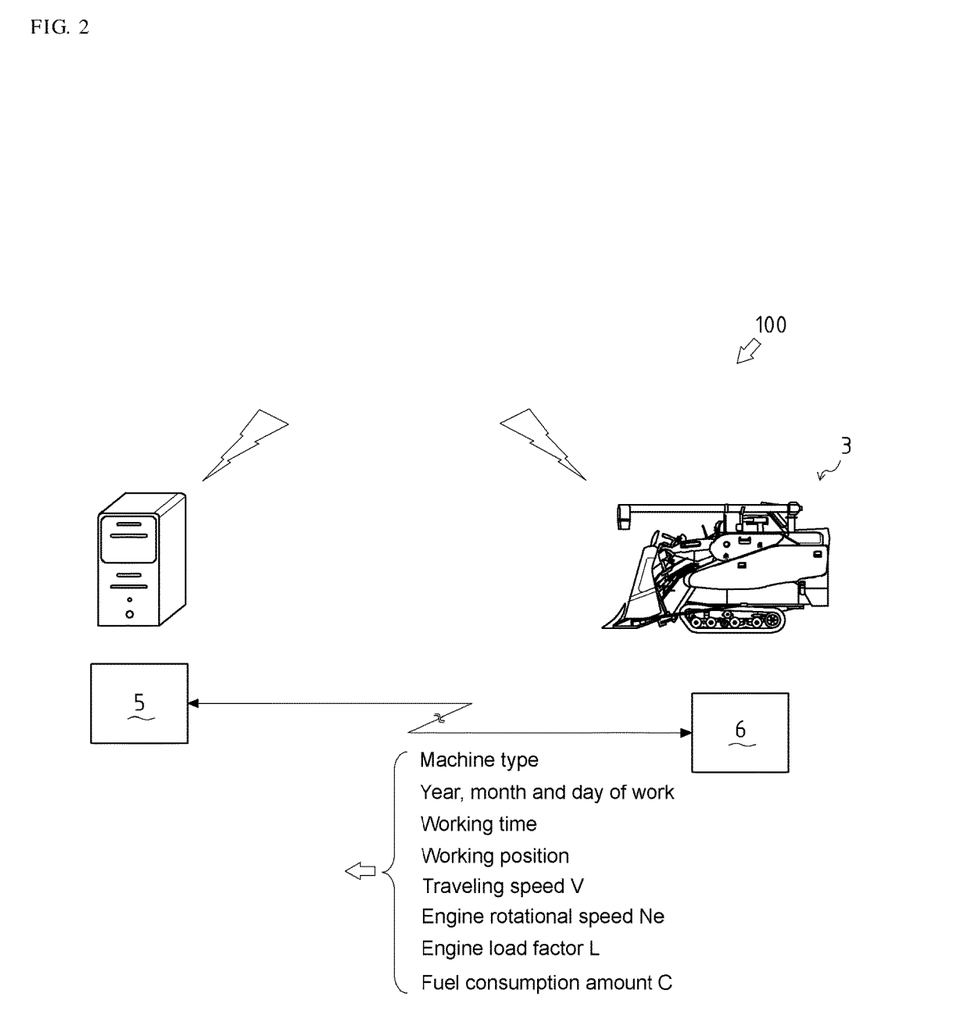
FIG. 2 is another schematic diagram showing a configuration of the remote server.

FIG. 2 schematically shows the remote server system 100.

The remote server system 100 of the present embodiment is a system that advises a user who uses the combine harvester 3 of an operation with low fuel consumption.

The remote server system 100 is configured such that a remote server 5 provided in the remote information center 110 (refer to FIG. 1) and terminal servers 6 provided in combine harvesters 3 can communicate with each other, for example. The remote server 5 is configured to be able to communicate with terminal servers 6 that are provided in many combine harvesters 3.

In the present embodiment, it is assumed that each terminal server 6 transmits, to the remote server 5, at least a type of the combine harvester 3 as information for machine identification, year, month, and day of operation and working time of the combine harvester 3 as information on an operating day of the combine harvester 3, a working position as position information, a traveling speed V as information on a moving speed, an engine rotational speed Ne as information on a rotational speed of the engine, an engine load factor L as information on a load factor of the engine, and a fuel consumption amount C as information on a fuel consumption amount. The fuel consumption amount C is a fuel consumption amount per unit time.

The working position is identified by a GPS, and is transmitted to the remote server 5. For the traveling speed V, the traveling speed V detected by the traveling speed sensor is transmitted to the remote server 5. For the engine rotational speed Ne, the engine rotational speed Ne detected by the engine rotational speed sensor is transmitted to the remote server 5.

For the engine load factor L, a rate of an injection quantity instructed by an ECU (Engine Control Unit) to a maximum injection quantity at the engine rotational speed Ne is transmitted to the remote server 5. For example, in a mechanical governor engine, a rack position detected by a rack position sensor is the engine load factor L. In an electronic governor engine, an accelerator rotation amount detected by an accelerator opening sensor is the engine load factor L.

First Embodiment

A flow of a low-fuel-consumption advice control S100 will be described with reference to FIG. 3.

Figure 3:
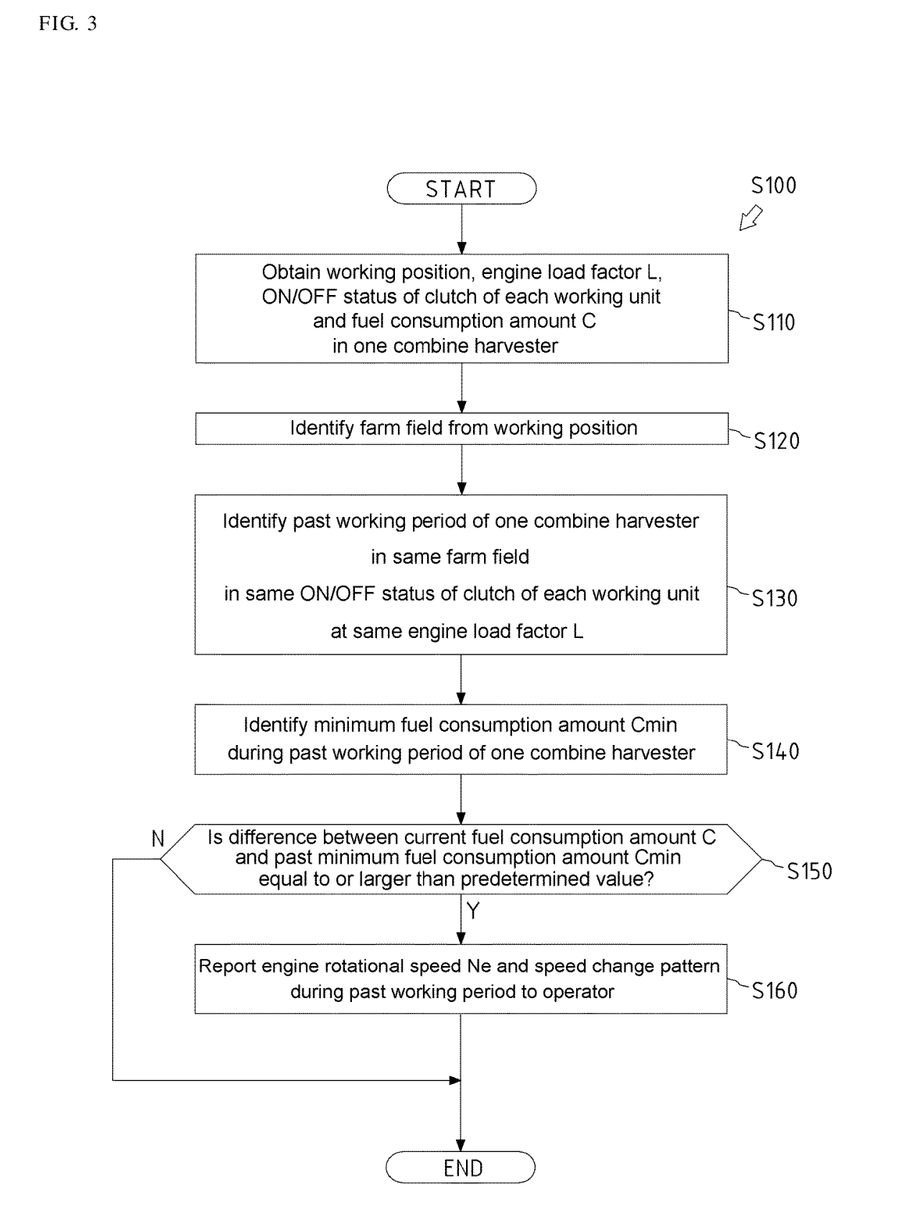
FIG. 3 is a flowchart of a low-fuel-consumption advice control S100.

FIG. 3 is a flowchart showing the flow of the low-fuel-consumption advice control S100.

The low-fuel-consumption advice control S100 is a control of the first embodiment performed by the remote server of the present invention. The low-fuel-consumption advice control S100 is a control that advises the combine harvester 3 which is working, of an operation with low fuel consumption, based on the past operation history of the same combine harvester 3.

In step S110, the remote server 5 obtains a working position, an engine load factor L, an ON/OFF status of a clutch of each working unit (a traveling unit, a reaping unit, a conveying unit, or a threshing unit), and a fuel consumption amount C of the combine harvester 3 which is currently working.

In step S120, the remote server 5 identifies a farm field in which the combine harvester 3 is currently working, from the obtained working position of the combine harvester 3.

In step S130, the remote server 5 identifies past working periods of the combine harvester 3 in the same farm field at the same engine load factor L in the same ON/OFF status of the clutch of each working unit. It is assumed that the same engine load factor L is ±3% of the current engine load factor L.

In step S140, the remote server 5 identifies a period during which the fuel injection amount C is a minimum fuel-injection amount Cmin, in the working periods identified in step S130.

In step S150, the remote server 5 subtracts the minimum fuel-injection amount Cmin identified in step S130 from the fuel injection amount C obtained in step S110, and determines whether the difference is equal to or larger than a predetermined value.

If the difference is equal to or larger than the predetermined value, the process proceeds to step S160. On the other hand, if the difference is less than the predetermined value, the remote server 5 determines that the combine harvester 3 is currently working with low fuel consumption, and ends the low-fuel-consumption advice control S100.

In step S160, the remote server 5 reports to the operator the engine rotational speed Ne and a speed change pattern of each working unit during the period of the minimum fuel-injection amount Cmin identified in step S130. As means for reporting to the operator, there is considered reporting to the terminal (a portable telephone or the like) of the operator.

An effect of the low-fuel-consumption advice control S100 will be described.

According to the low-fuel-consumption advice control S100, if the current fuel consumption amount is larger than a minimum fuel consumption amount within a past operation history of the same combine harvester 3 in a similar operating condition, an operation status at an operating day of the minimum fuel consumption amount can be recognized.

Second Embodiment

A flow of a low-fuel-consumption advice control S200 will be described with reference to FIG. 4.

Figure 4:
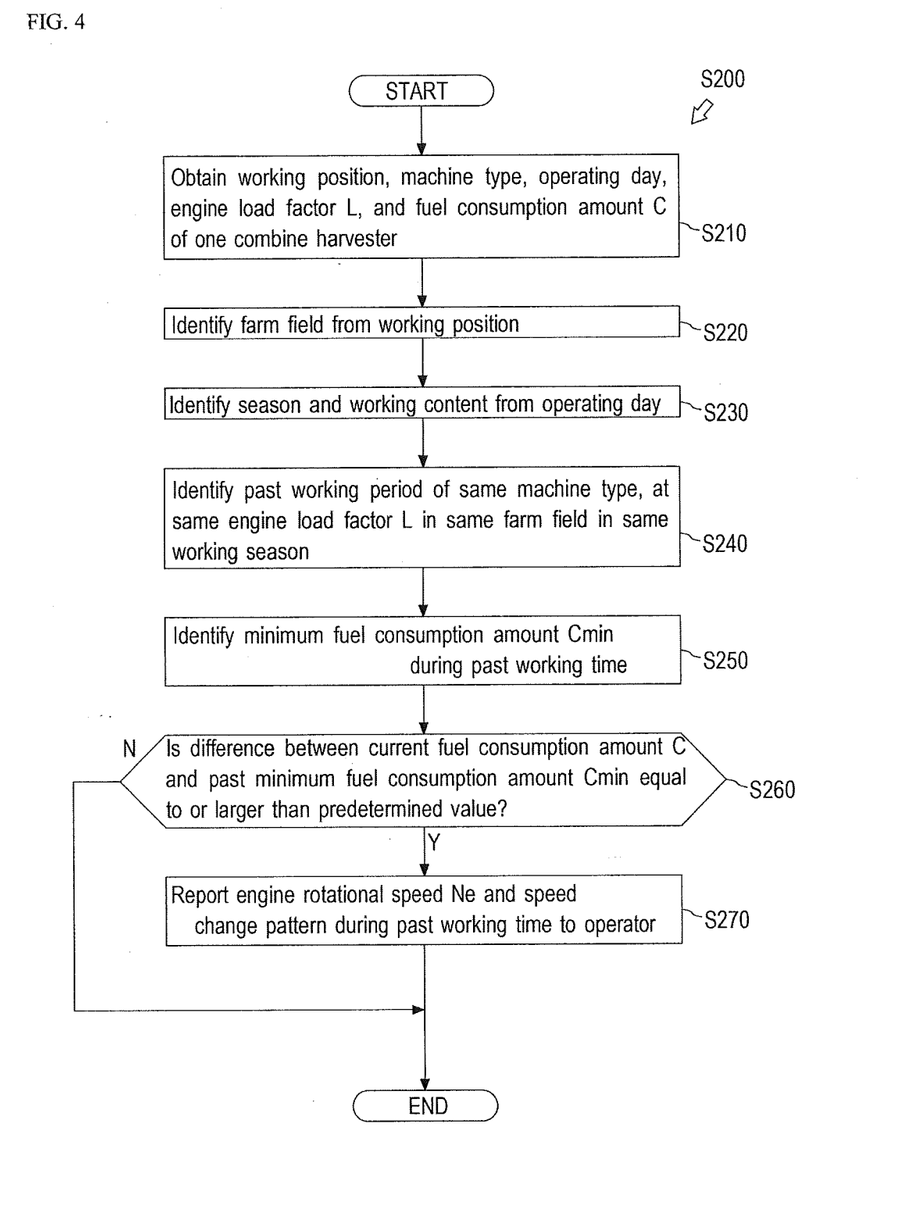
FIG. 4 is a flowchart of a low-fuel-consumption advice control S200.

FIG. 4 is a flowchart showing the flow of the low-fuel-consumption advice control S200.

The low-fuel-consumption advice control S200 is a control of the second embodiment performed by the remote server of the present invention. The low-fuel-consumption advice control S200 is a control that advises the combine harvester 3 which is working, of an operation with low fuel consumption, based on the past operation history of the same machine type.

In step S210, the remote server 5 obtains a working position, a machine type, an engine load factor L, and a fuel consumption amount C of the combine harvester 3 which is currently working.

In step S220, the remote server 5 identifies a farm field in which the combine harvester 3 is currently working, from the obtained working position of the combine harvester 3.

In step S230, the remote server 5 identifies a working season from the obtained working day of the combine harvester 3. When the working season is identified, working content (reaping work and the like) is also identified.

In step S240, the remote server 5 identifies past working periods of the combine harvester 3 of the same machine type in the same farm field in the same working season at the same engine load factor L. It is assumed that the same engine load factor L is ±3% of the current engine load factor L.

In step S250, the remote server 5 identifies a period during which the fuel injection amount C is a minimum fuel-injection amount Cmin, in the working periods identified in step S240.

In step S260, the remote server 5 subtracts the minimum fuel-injection amount Cmin identified in step S250 from the fuel injection amount C obtained in step S210, and determines whether the difference is equal to or larger than the predetermined value.

If the difference is equal to or larger than the predetermined value, the process proceeds to step S270. On the other hand, if the difference is less than the predetermined value, the remote server 5 determines that the combine harvester 3 is currently working with low fuel consumption, and ends the low-fuel-consumption advice control S200.

In step S270, the remote server 5 reports to the operator the engine rotational speed Ne and a speed change pattern of each working unit during the period of the minimum fuel-injection amount Cmin identified in step S250. As means for reporting to the operator, there is considered reporting to the terminal (a portable telephone or the like) of the operator.

An effect of the low-fuel-consumption advice control S200 will be described.

According to the low-fuel-consumption advice control S200, if a current fuel consumption amount is larger than the minimum fuel consumption amount Cmin within the past operation history of the combine harvester 3 of the same machine type in a similar operating condition, an operation status during a working period of the minimum fuel consumption amount Cmin can be recognized.

Third Embodiment

A fuel consumption amount map 50 will be described with reference to FIG. 5.

Figure 5:
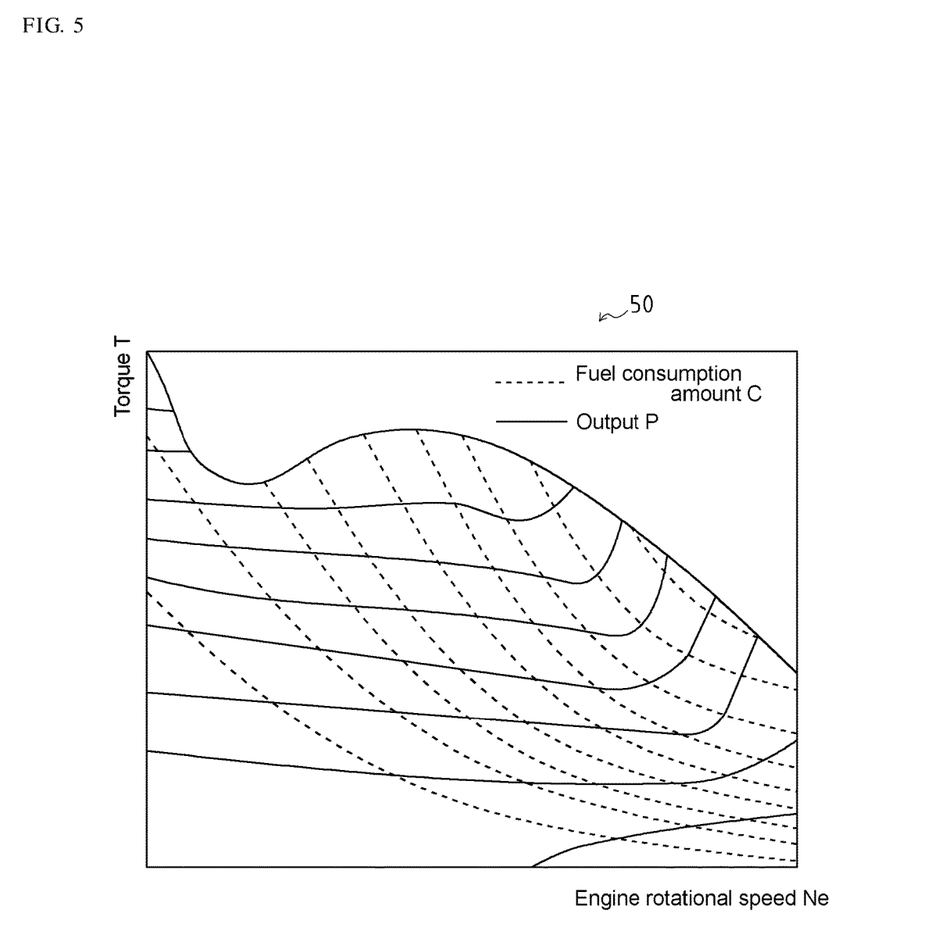
FIG. 5 is a graph showing a map of a fuel consumption amount.

In FIG. 5, the horizontal axis indicates the engine rotational speed Ne, and the vertical axis indicates torque T. The fuel consumption amount map 50 is shown as a graph.

The fuel consumption amount map 50 is a map showing a characteristic of the engine. The fuel consumption amount map 50 shows a characteristic of the engine based on the engine rotational speed Ne, the torque T, the fuel consumption amount C, and an output P, for each type of the engine.

The output P indicated by an output curve (a solid line in the graph) increases toward the upper left in the graph. A fuel consumption amount C indicated by a fuel-consumption-amount curve (a broken line in the graph) increases toward the upper right in the graph. The load factor L is a rate of the torque T in a maximum torque determined by the engine rotational speed Ne.

A flow of a low-fuel-consumption advice control S300 will be described with reference to FIG. 6.

Figure 6:
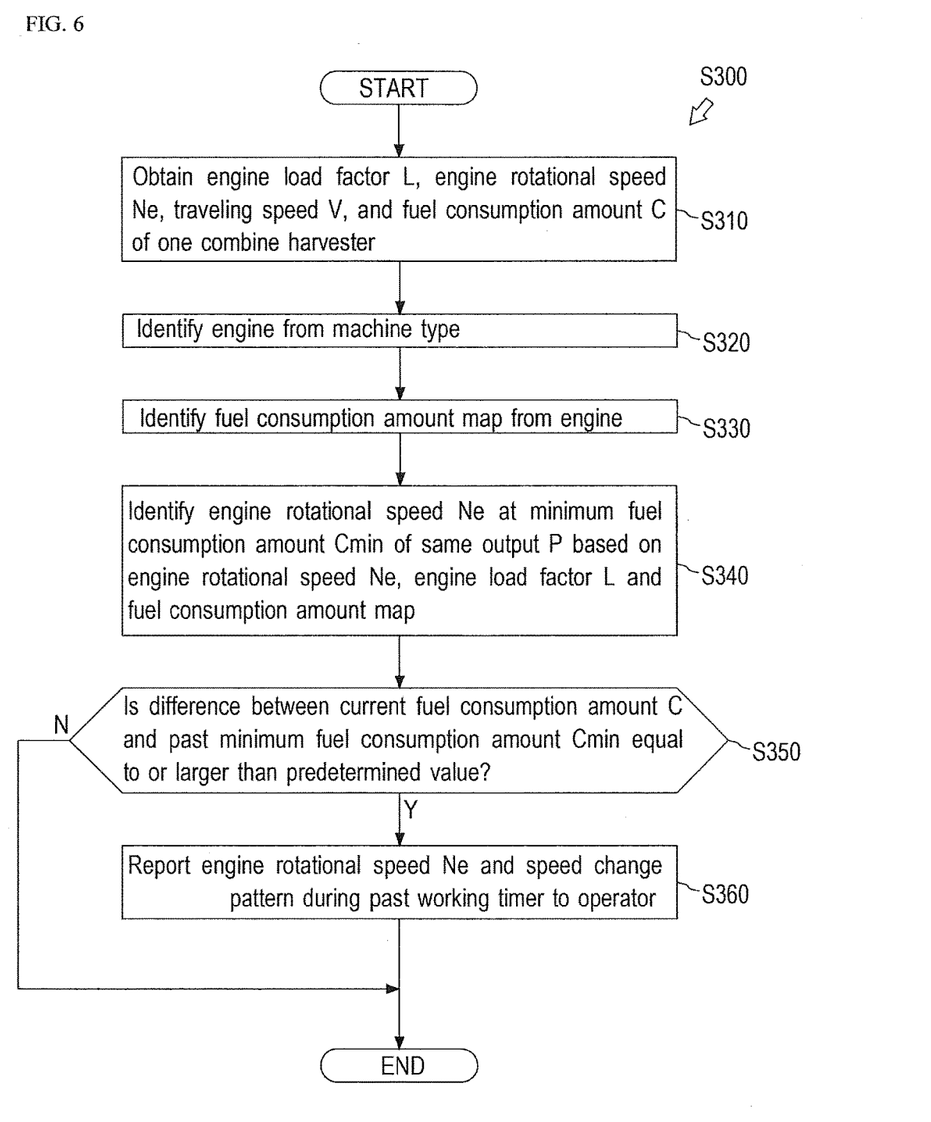
FIG. 6 is a flowchart of a low-fuel-consumption advice control S300.

FIG. 6 is a flowchart showing the flow of the low-fuel-consumption advice control S300.

The low-fuel-consumption advice control S300 is a control of the third embodiment performed by the remote server of the present invention. The low-fuel-consumption advice control S300 is a control that advises the combine harvester 3 which is working, of an operation with low fuel consumption, based on the fuel consumption amount map 50 of the mounted engine.

In step S310, the remote server 5 obtains a machine type, a load factor L, an engine rotational speed Ne, a traveling speed V, and a fuel consumption amount C of the combine harvester 3 at a position where the combine harvester 3 is currently working.

In step S320, the remote server 5 identifies a type of the engine which is mounted in the combine harvester 3, from the obtained machine type of the combine harvester 3.

In step S330, the remote server 5 identifies the fuel consumption amount map 50 which is unique to the engine, from the obtained type of the engine.

In step S340, the remote server 5 calculates the output P based on the obtained engine rotational speed Ne, load factor L, and fuel consumption amount map 50. Then, the remote server 5 calculates the minimum fuel consumption amount Cmin at the calculated output P.

In step S350, the remote server 5 subtracts the minimum fuel-injection amount Cmin identified in step S340 from the fuel injection amount C obtained in step S310, and determines whether the difference is equal to or larger than a predetermined value.

If the difference is equal to or larger than the predetermined value, the process proceeds to step S360. On the other hand, if the difference is less than the predetermined value, the remote server 5 determines that the combine harvester 3 is currently working with low fuel consumption, and ends the low-fuel-consumption advice control S300.

In step S360, the remote server 5 reports to the operator the engine rotational speed Ne and a speed change pattern of each working unit during the period of the minimum fuel consumption amount Cmin identified in step S340. As means for reporting to the operator, there is considered reporting to the terminal (a portable telephone or the like) of the operator.

An effect of the low-fuel-consumption advice control S300 will be described.

According to the low-fuel-consumption advice control S300, the engine operation status of the minimum fuel consumption amount Cmin can be recognized in real time.

INDUSTRIAL APPLICABILITY

The present invention can be utilized for a remote server.

REFERENCE SIGNS LIST

3 Combine harvester
5 Remote server
6 Terminal server
50 Fuel consumption amount map
100 Remote server system

The invention claimed is:

1. A remote server that receives information for machine identification, information on an operating day, position information, information on a load factor, information on a rotational speed of an engine, information on a moving speed, and information on a fuel consumption amount, from a terminal server provided in a machine, wherein
the remote server identifies a working position by a GPS, identifies from the working position a farm field in which work is currently performed, selects, based on the information for machine identification, past working periods during which a same machine in a same farm field is in an operation status corresponding to a current load factor, selects a period during which the fuel consumption amount is minimum in the selected past working periods,
and compares a current fuel consumption amount with the past minimum fuel consumption amount, and if the current fuel consumption amount is larger than the past minimum fuel consumption amount, the remote server transmits the information on the rotational speed of the engine and a speed change pattern of each working unit during a working period of the minimum fuel consumption amount to a predetermined communication terminal corresponding to the information for machine identification.

2. A remote server that receives information for machine identification, information on an operating day, position information, information on a load factor, information on a rotational speed of an engine, information on a moving speed, and information on a fuel consumption amount, from a terminal server provided in a machine, wherein
the remote server identifies a working position by a GPS, identifies from the working position a farm field in which work is currently performed, identifies a working season from the operating day, identifies past working periods during which a machine type same as a machine type identified based on the information for machine identification has a same load factor in a same working season in a same farm field, identifies a period during which a fuel consumption amount is minimum in the identified past working periods, and compares a fuel consumption amount of a working machine being currently working with the minimum fuel consumption amount, and if the fuel consumption amount of the working machine being currently working is larger than the minimum fuel consumption amount, the remote server transmits the information on the rotational speed of the engine and a speed change pattern of each working unit of the working machine whose fuel consumption amount is minimum during the period of the minimum fuel consumption amount to a predetermined communication terminal corresponding to the information for machine identification.

3. A remote server that receives information for machine identification, information on a load factor, information on a rotational speed of an engine, information on a moving speed, and information on a fuel consumption amount, from a terminal server provided in a machine, wherein
the remote server identifies a type of the engine based on the information for machine identification, identifies the rotational speed of the engine, torque, output, and a characteristic map of the fuel consumption amount which correspond to the type of the engine, identifies corresponding output in the characteristic map from the rotational speed of the engine and the load factor, and transmits, based on the characteristic map, the rotational speed of the engine and a speed change pattern of each working unit at an operating point of a minimum fuel consumption amount in the specified output, to a predetermined communication terminal corresponding to the information for machine identification.

* * * * *